(12) United States Patent
Cassani

(10) Patent No.: US 12,313,026 B2
(45) Date of Patent: May 27, 2025

(54) ELECTRICITY GENERATION AND ACCUMULATION SYSTEM

(71) Applicant: Walter Cassani, Vittuone (IT)

(72) Inventor: Walter Cassani, Vittuone (IT)

( * ) Notice: Subject to any disclaimer, the term of this patent is extended or adjusted under 35 U.S.C. 154(b) by 18 days.

(21) Appl. No.: 18/558,193

(22) PCT Filed: Jul. 7, 2022

(86) PCT No.: PCT/IB2022/056287
§ 371 (c)(1),
(2) Date: Oct. 31, 2023

(87) PCT Pub. No.: WO2023/007282
PCT Pub. Date: Feb. 2, 2023

(65) Prior Publication Data
US 2024/0263604 A1 Aug. 8, 2024

(30) Foreign Application Priority Data
Jul. 28, 2021 (IT) .................... 102021000020120

(51) Int. Cl.
*F03B 13/00* (2006.01)
*F01D 15/10* (2006.01)
*F15B 1/26* (2006.01)

(52) U.S. Cl.
CPC ............ *F03B 13/00* (2013.01); *F01D 15/10* (2013.01); *F15B 1/265* (2013.01); *F05B 2220/706* (2013.01); *F05D 2220/76* (2013.01)

(58) Field of Classification Search
CPC ............... F03B 13/00; F05B 2220/302; F05D 2220/76; F15B 1/265
See application file for complete search history.

(56) References Cited

U.S. PATENT DOCUMENTS

| | | | | | |
|---|---|---|---|---|---|
| 4,086,765 | A | * | 5/1978 | Gillilan | F03B 17/005 417/125 |
| 8,215,111 | B1 | * | 7/2012 | Richey | F03B 13/00 60/512 |

(Continued)

FOREIGN PATENT DOCUMENTS

| | | | | |
|---|---|---|---|---|
| EP | 3184807 A1 | 6/2017 | | |
| WO | WO-2006021975 A1 | * | 3/2006 | ............... E02B 9/06 |

OTHER PUBLICATIONS

ISR: European Patent Officel Sep. 14, 2022.

*Primary Examiner* — Matthew Wiblin
(74) *Attorney, Agent, or Firm* — Patshegen IP; Moshe Pinchas

(57) ABSTRACT

An electricity generation and accumulation system, comprising a tank (9) for air or gas at stabilized pressure, provided with a duct (11) for feeding said pressurized air or gas to a plurality of pressurized auxiliary tanks (12a, 12b, 12c), the first of which is filled with a liquid. The system of the invention is provided with a plurality of water turbines (18a, 18b, 18c) calibrated according to the pressure inside the respective auxiliary tanks (12a, 12b, 12c) with which they are associated.

Compared to the prior art systems for accumulation and generation of electricity, the system according to the invention offers the important advantage of increasing the efficiency in the production of electricity and of including a device equipped with a control panel (3b) and a self-regulating electrical system that will supply the system with overproduction waste useful for transforming the same into another form of energy that can be reused during periods of underproduction or for other purposes, provided with an exchange meter and remote control (for example, control managed by the grid operator or others). The overproduction waste transformed into another form can be reused for the (Continued)

production of hydrogen (transformation of electricity into chemical energy, hydrogen, or other), increasing the efficiency thereof.

9 Claims, 5 Drawing Sheets

(56) References Cited

U.S. PATENT DOCUMENTS

| | | | |
|---|---|---|---|
| 2002/0144504 | A1 | 10/2002 | Merswolke |
| 2010/0139777 | A1* | 6/2010 | Whiteman ............. F17C 5/007 137/255 |
| 2010/0253080 | A1* | 10/2010 | DeAngeles ........... F03B 17/005 290/52 |
| 2011/0062166 | A1* | 3/2011 | Ingersoll ................ F02G 1/044 220/581 |
| 2014/0091574 | A1* | 4/2014 | Favy ........................ F02C 6/16 137/209 |
| 2015/0362124 | A1* | 12/2015 | Favy ........................ F02C 6/16 206/0.6 |
| 2018/0156185 | A1 | 6/2018 | Neu |

* cited by examiner

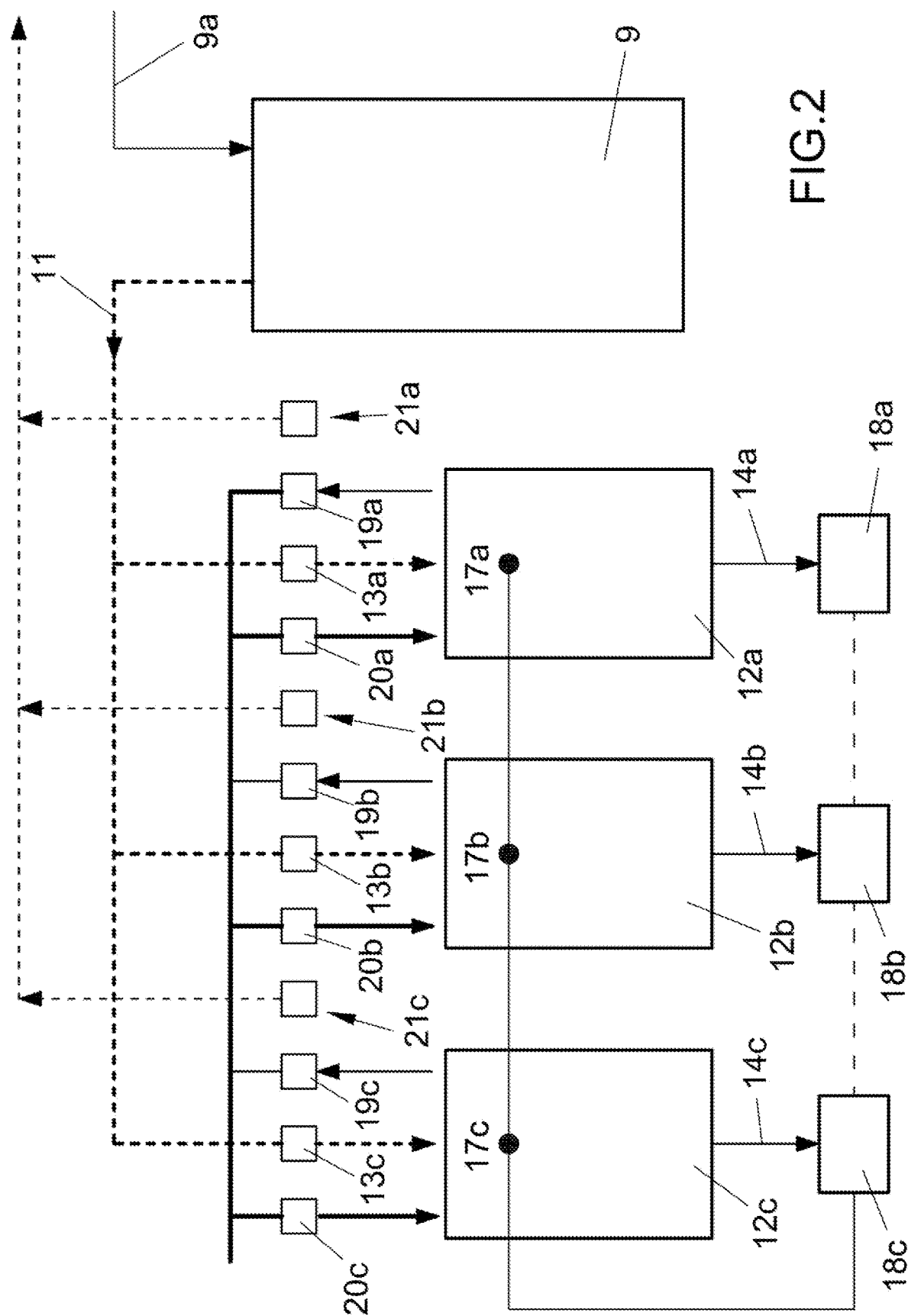

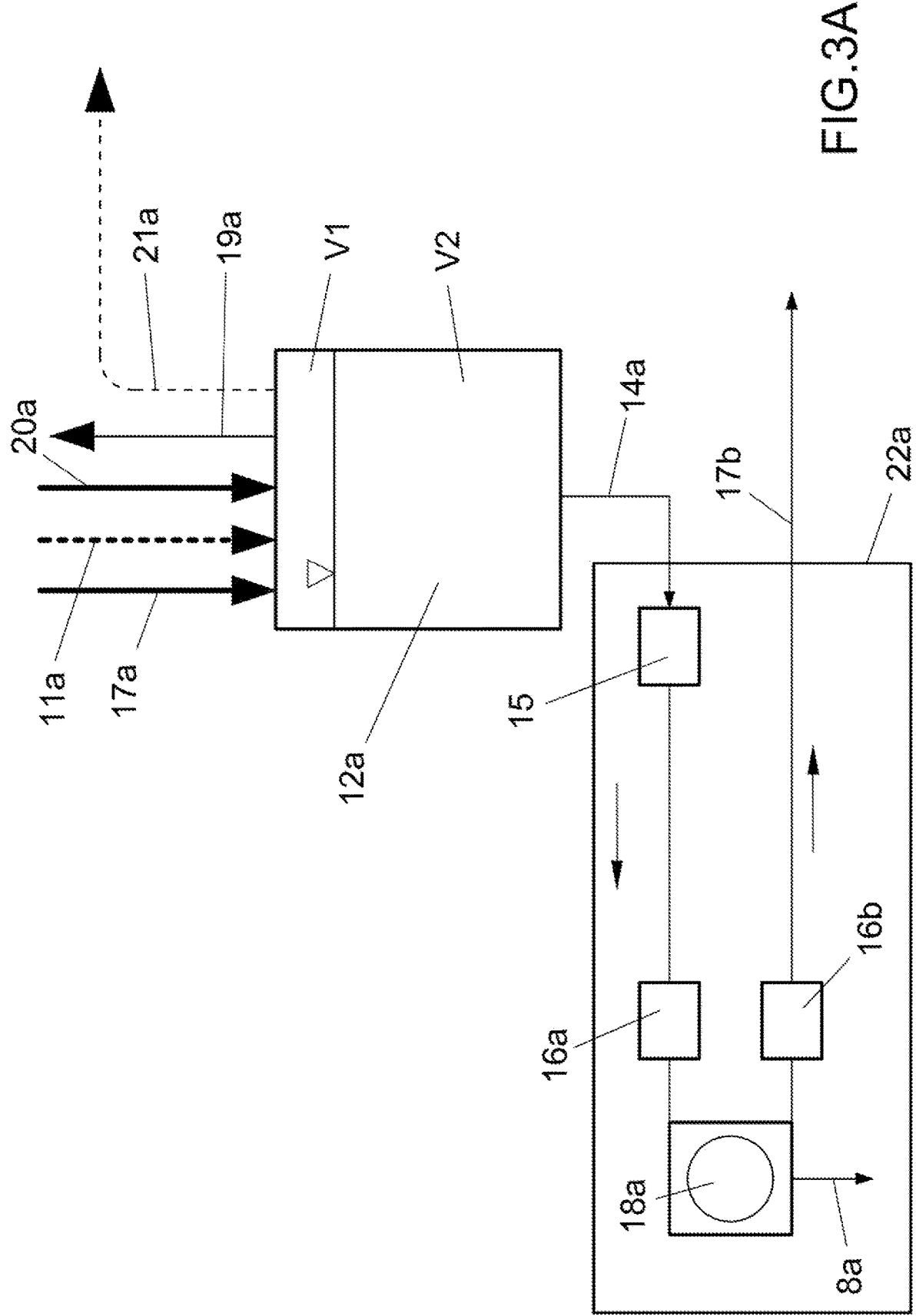

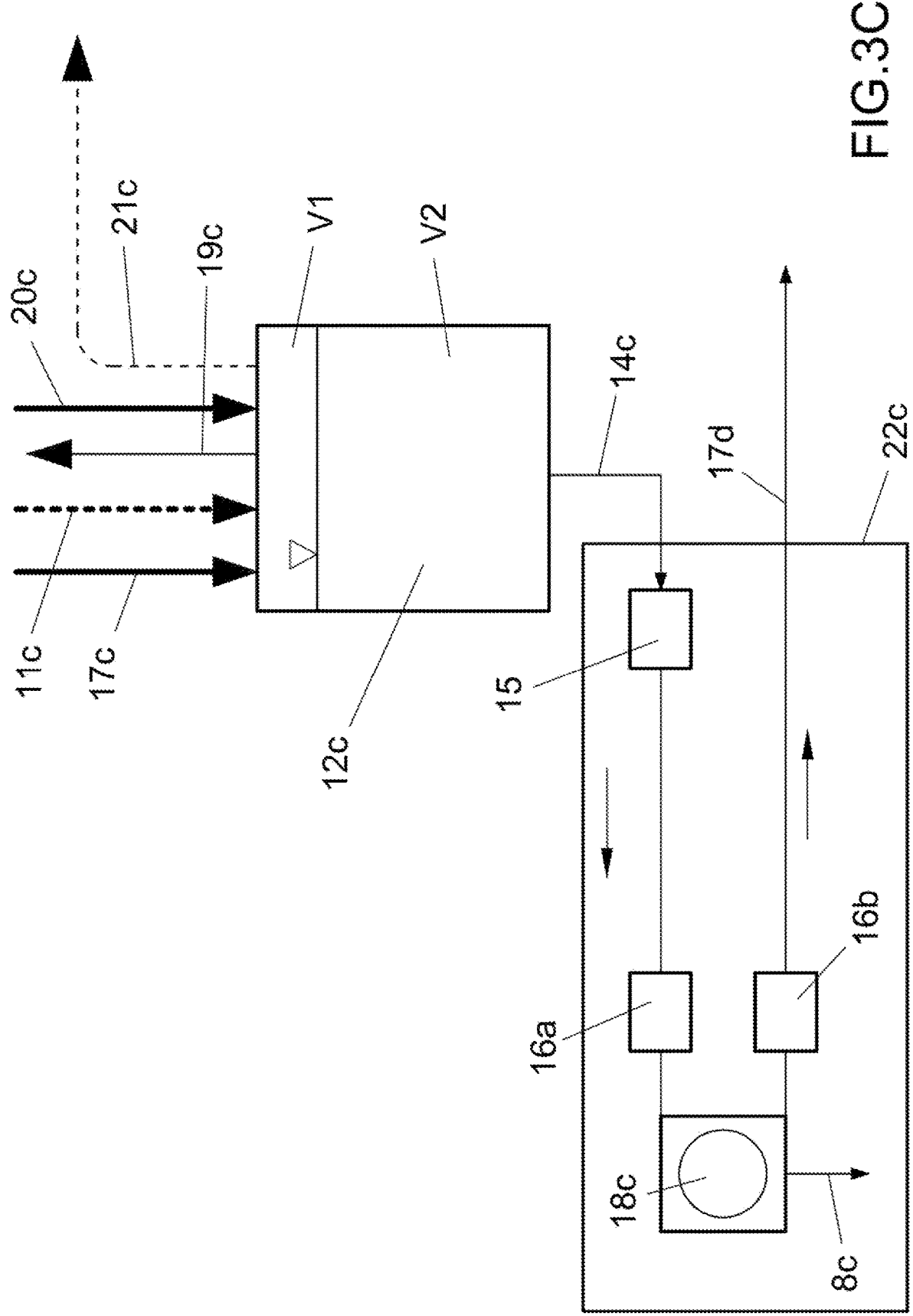

ELECTRICITY GENERATION AND ACCUMULATION SYSTEM

BACKGROUND OF THE INVENTION

The present invention relates to an improved system for the generation and accumulation of electricity.

As is known, the generation of electricity through renewable sources, such as photovoltaic panels, wind turbines and the like, which do not generate electricity continuously, requires electricity storage or accumulation systems, so that electricity can also be used when it is not being generated.

The accumulation of electricity is currently carried out mostly by means of batteries or other similar systems, essentially experimental systems, such as flywheels.

The system described in Italian patent application No. IT201700087718A1 filed on Jul. 31, 2017 in the name of the same Applicant is also currently known.

Published Patent Application No. US 2018/156185 A1 discloses a device and a method for converting electricity into pneumatic energy and vice versa.

SUMMARY OF THE INVENTION

The aim of the present invention is to provide an electricity generation and accumulation system, which is conceptually new and extremely more effective than the accumulation systems known so far.

Another object of the invention is to provide an electricity generation and accumulation system which is adaptable to the production and storage of electricity both in low power applications, such as domestic users, and in higher power applications.

A further object of the system of the invention is that of being powered by overproduction waste, useful for transforming the same into another form of energy, which can be reused in periods of underproduction or for other purposes.

Yet another object of the present invention is to provide a system which can be produced by using elements and materials commonly available on the market, and which is also competitive from an economic point of view.

These and other objects are achieved with the system of claim 1. Preferred embodiments of the invention will be apparent from the remaining claims.

Compared to the known systems for accumulation and generation of electricity, the system according to the invention offers the important advantage of increasing the efficiency in the production of electricity, as it does not require to restore the internal pressure of auxiliary tanks.

A significant contribution made by the invention is represented by the fact that, unlike the prior art, the present system receives pressurized air or gas at the first auxiliary tank only, since the pressure drop that occurs on the remaining auxiliary tanks arranged downstream of the first one is compensated for by the use of specific turbines, designed for operation at a lower pressure than that of the initial turbine.

Another advantage is represented by the recovery of the electricity, supplied in excess by the system of the invention to the user consuming it, which can be used to restore the internal pressure of the air or gas in the main tank.

A further advantage of the invention is represented by the presence of an auxiliary tank at a negative pressure, the latter being generated by the main compressor for filling air or gas into the main tank. This facilitates the removal of gas from the auxiliary tanks.

BRIEF DESCRIPTION OF THE DRAWINGS

These and other objects, advantages and features will be apparent from the following description of a preferred embodiment of the system according to the invention, illustrated by way of non-limiting example in the figures of the attached drawings sheets.

In these:

FIG. 2 illustrates the diagram of the auxiliary tanks for pressurized air or gas, associated with the main tank for pressurized gas or air of the system of FIG. 1;

FIGS. 3A, 3B, 3C illustrate details of the air and water circuits in the auxiliary tanks of the system diagram of FIG. 2.

DETAILED DESCRIPTION OF THE PREFERRED EMBODIMENTS

Figure 1:
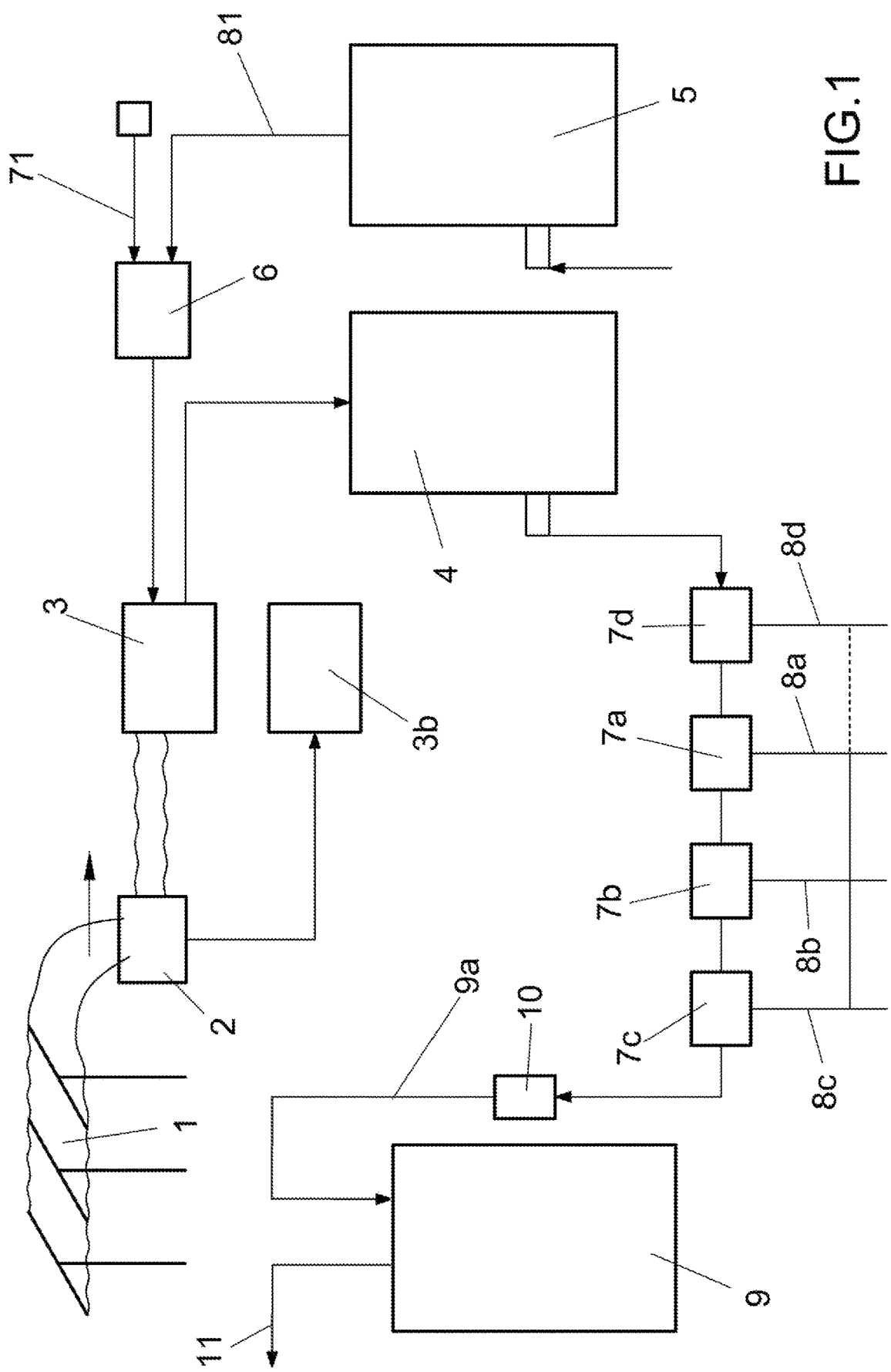
FIG. 1 illustrates a simplified diagram of the system of the invention, used for the generation and accumulation of electricity to be supplied to the distribution grid.

The system illustrated in FIG. 1 is powered by an external electricity or renewable energy grid 1, the consumption of which is measured by means of a corresponding exchange meter and remote control device 2, suitable for further recording the production of the electricity supplied by the system of the invention.

The system of the invention is further provided with a remote control panel 3b, which controls all the electrical components of the system of the invention. The panel 3b is in particular equipped with a self-regulating electrical system, intended to supply the system with overproduction waste, useful for transforming the same into another form of energy, which can be reused in periods of underproduction or for other purposes.

The overproduction waste transformed into another form can be reused for the production of hydrogen (transforming electricity into chemical energy, hydrogen, or other), increasing the efficiency thereof.

The energy supplied by the grid 1 powers at least one compressor 3, which performs the dual function of sending pressurized air or other gas to a tank 4 for accumulation of pressurized air or other gas, and of withdrawing air or gas by Venturi effect from the vacuum tank 5.

A device 6 is provided to control the inlets, preferably filtered, for external air 71 and for air 81 coming from the tank 5.

The air loaded into the high-pressure tank 4 (for instance, at 600 bar) is then transferred from the latter to a series of high-pressure air or other gas turbines 7a, 7b, 7c, suitable for generating electricity which in turn is transmitted to the respective users 8a, 8b, 8c of the grid 1, also in the presence of a suitable electrical control panel (not shown).

Inside the turbines 7 the air or gas coming from the tank 4 undergoes a substantial pressure drop (for example to 6 bar) and is sent, through a respective duct 9a, into a tank 9 for air or gas at stabilized pressure.

Advantageously, provided on the tank 9 air inlet is a device 10 with check valve, suitable for stabilizing the air pressure drop between said tanks 4 and 9.

The duct 11 for air or gas at stabilized pressure coming from the tank 9 then performs the transfer of this fluid to the pressurized auxiliary tanks 12a, 12b, 12c illustrated in FIG. 2, by means of respective air or gas manifolds 13a, 13b, 13c.

The first auxiliary tank 12a is filled with a liquid, preferably water, fed by the duct 17, 17a and, when it receives the pressurized air or gas coming from the duct 11a of the tank 9, it discharges the water through the corresponding duct 14a.

Preferably the tank 12a in FIG. 3a is filled with a volume V1 corresponding to ¼ air and a volume V2 corresponding to ¾ water.

The water discharged from the tank 12a through the outlet duct 14a passes through a solenoid valve or a compressed air actuator 15, from where it enters a heat exchanger 16a for heat recovery and subsequently feeds a water turbine 18a, which in turn generates and supplies electricity to the corresponding user 8a.

The water turbine 18a is calibrated for operation with the pressure inside the first auxiliary tank 12a.

The water leaving the turbine 18a passes through a heat exchanger 16b and enters a respective duct 17b, with relative feed manifold, with water under pressure, of the subsequent auxiliary tank 12b.

Figure 3B:
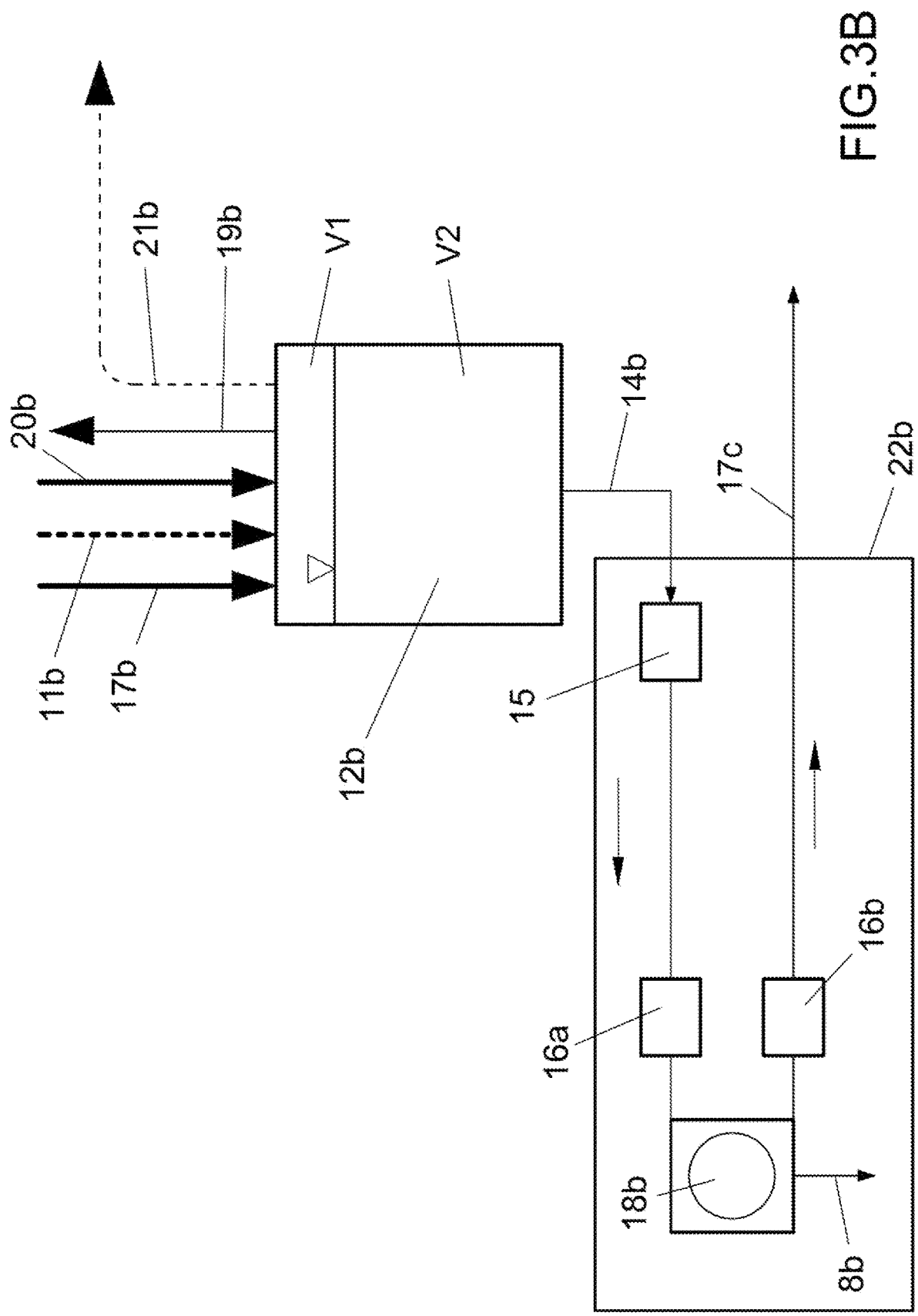

The water in duct 17b is at a lower pressure than that of the water coming from duct 14a and is supplied to the subsequent auxiliary tanks 12b, 12b, 12c in the way illustrated in the respective FIGS. 3B and 3C.

In particular, the above-described pressurized air or gas circuit is associated with a corresponding closed loop water circuit, the volume V1 of which, initially loaded in the first tank 12a, is transferred completely and in cascade to the subsequent tanks 12b and 12c, passing through the respective turbine units 22a, 22b, 22c.

In particular, each auxiliary tank is associated with a respective water turbine 18b and 18c, also in this case proportional to the different pressure value established in the corresponding auxiliary tanks 12b and 12c.

It should be noted that the number of auxiliary tanks, as well as the respective water turbines, may be even greater than that indicated in the figures, depending on the electricity production needs that the system has to meet.

The auxiliary tanks 12a, 12b and 12c further have manifolds, and solenoid valves with check valves, respectively:
- manifolds 19a, 19b, 19c for the outlet and inlet of air or gas from the tanks 12a, 12b and 12c, for the purpose of compensating for the pressure drop with respect to the upstream tank 12a, 12b, 12c;
- manifolds 20a, 20b, 20c for the inlet of air or gas into the tanks 12a, 12b, 12c for the purpose of compensating for the pressure drop with respect to the upstream tank 12a, 12b, 12c;
- manifolds 21a, 21b, 21c for the suction of air or gas from the tanks 12a, 12b, 12c towards the vacuum tank 5.

The system of the invention therefore substantially provides air or gas circulation circuits between the auxiliary tanks 12a, 12b, 12c as a function of the quantity of water removed from the tank 12a and transferred in cascade to the subsequent auxiliary tanks 12b and 12c, at least two of which are partially filled with water. The higher the number of pressurized auxiliary tanks, the higher the efficiency of the system of the invention.

According to the invention, and as described above and shown in the figures, the tanks 12a, 12b, 12c are filled mostly with water and, for the remaining volume, with pressurized air or gas, wherein the pressurized gas pushes the water needed to operate the turbines.

In the embodiment described above and illustrated in the figures, one water turbine is associated with each auxiliary tank. However, it is possible to combine several auxiliary tanks on the same water turbine, so as to avoid to provide as many turbines as there are auxiliary tanks equipping the system of the invention.

According to an example of use of the system of the invention, said system could be used to receive, inside the tank 4, hydrogen pressurized in the tanks, using a dual air-gas separation turbine (7d), upstream of the turbines (7a, 7b, 7c), or natural gas coming from a reservoir, fed by means of a respective turbine. In this case, the extraction of natural gas results, by means of the system of the invention, into a source of production of electricity, generated by the very pressure of the extracted gas.

Another example of application of the invention is represented by the over 400-bar storage systems in which, by providing dual air-gas turbines (7d), the gas is separated, producing compressed air (8d). The compressed air is then fed upstream of the turbines (7a, 7b, 7c) into decompression cabins, which are used to reduce the pressure, for example from 50-60 bar to 12 bar (medium pressure grid), of the gas, hydrogen, or other.

The invention claimed is:

1. An electricity generation and accumulation system, comprising:
   a tank (9) for air or gas at stabilized pressure,
   a duct (11) for feeding said pressurized air or gas to a plurality of pressurized auxiliary tanks (12a, 12b, 12c) filled with a liquid,
   wherein the system is further provided with a plurality of water turbines (18a, 18b, 18c) calibrated according to a pressure inside a respective auxiliary tank (12a, 12b, 12c) of the plurality of auxiliary tanks with which each water turbine is associated,
   wherein each water turbine (18a, 18b, 18c) of the plurality of water turbines receives pressurized water from one or more of said plurality of auxiliary tanks (12a, 12b, 12c) and sends water back to the one or more auxiliary tanks arranged downstream, with a cascade sequence, and
   wherein said system further comprising a high pressure air or gas tank (4) supplying the pressurized air or gas to said tank (9) at the stabilized pressure, through a plurality of air or gas turbines (7a, 7b, 7c) that generate electricity, or dual turbines (7d) that generate compressed air to be fed in upstream of the plurality of air or gas turbines (7a, 7b, 7c) and that cause an air or gas pressure to drop between said high pressure air or gas tank (4) and said tank (9).

2. The system according to claim 1, further comprising a tank (5) for the air or gas under vacuum, suitable for recovery of the air or gas contained in said plurality of auxiliary tanks (12a, 12b, 12c) when the pressurized water inside the plurality of auxiliary tanks is being discharged.

3. The system according to claim 2, characterized in that said plurality of auxiliary tanks (12a, 12b, 12c) are provided with a plurality of manifolds, each equipped with solenoid valves and check valves, the plurality of manifolds comprising:
   manifolds (19a, 19b, 19c) for the outlet of air from the plurality of auxiliary tanks (12a, 12b, 12c) for the purpose of compensating for a pressure drop with respect to an upstream auxiliary tank (12a, 12b, 12c) of the plurality of auxiliary tanks;
   manifolds (20a, 20b, 20c) for the inlet of the air or gas into the plurality of auxiliary tanks (12a, 12b, 12c) for the purpose of compensating for a pressure drop with respect to an upstream auxiliary tank (12a, 12b, 12c) of the plurality of auxiliary tanks; and
   manifolds (21a, 21b, 21c) for the suction of the air or gas from the plurality of auxiliary tanks (12a, 12b, 12c) towards the vacuum tank (5).

4. The system according to claim 1, further comprising a device (10) equipped with a check valve for stabilizing the pressurized air or gas between said high pressure air or gas tank (4) and tank (9).

5. The system according to claim 1, characterized in that said plurality of auxiliary tanks (12a, 12b, 12c) are provided with water discharge ducts (14a, 14b, 14c) comprising a solenoid valve or an actuator (15) located upstream and a heat exchangers (16a, 16b), arranged upstream and downstream of a respective water turbine (18a, 18b, 18c) of the plurality of water turbines.

6. The system according to claim 1, further comprising ducts (17a, 17b, 17c) for recirculating the pressurized water from said water turbines (18a, 18b, 18c) towards the plurality of auxiliary tanks arranged downstream.

7. The system according to claim 1, further comprising at least one compressor (3) for the pressurized air or other gas.

8. The system according to claim 1 further comprising air or gas manifolds (13a, 13b, 13c) for transferring the air or gas from the tank (9) at the stabilized pressure to said plurality of auxiliary tanks (12a, 12b, 12c).

9. A process for generation and accumulation of electricity comprising:
   providing the electricity generation and accumulation system of claim 1,
   using the plurality of water turbines (18a, 18b, 18c), wherein the using further comprises:
   each water turbine (18a, 18b, 18c) of the plurality of water turbines receives the pressurized water from the one or more of said plurality of auxiliary tanks (12a, 12b, 12c), and
   sends the pressurized water back to the plurality of auxiliary tanks arranged downstream, with the cascade sequence of closed loop water transfer.

* * * * *